United States Patent
Haddock

[15] 3,691,440
[45] Sept. 12, 1972

[54] OVERSPEED DETECTOR
[72] Inventor: Logan D. Haddock, Provo, Utah
[73] Assignee: United States Steel Corporation
[22] Filed: April 16, 1971
[21] Appl. No.: 134,563

[52] U.S. Cl............318/313, 317/13 R, 317/19, 317/33 SC, 318/327
[51] Int. Cl...............................A02p 5/16
[58] Field of Search.......318/327, 341; 307/13 R, 19, 307/33 SC

[56] References Cited

UNITED STATES PATENTS

| | | | |
|---|---|---|---|
| 3,582,699 | 6/1971 | Badessa | 318/327 |
| 3,409,814 | 11/1968 | Azuma | 318/327 |
| 3,581,176 | 5/1971 | Bigg | 318/327 |
| 3,462,670 | 8/1969 | Waye | 318/327 |

Primary Examiner—Bernard A. Gilheany
Assistant Examiner—Thomas Langer
Attorney—Rea C. Helm

[57] ABSTRACT

A shaft overspeed detector has a shaft-mounted strip which periodically interrupts a light beam falling on a photosensitive cell as the shaft rotates. An electrical circuit provides a time-based pulse for each interruption and if a second interruption occurs before the time-based pulse has risen to a cutoff level, a speed controller is activated.

4 Claims, 2 Drawing Figures

INVENTOR
LOGAN D. HADDOCK

By Rea C. Helm

Attorney

OVERSPEED DETECTOR

This invention relates to speed regulation of rotating machinery and more particularly to apparatus for detecting when a shaft is rotating faster than a desired limit.

It is important to regulate the speed of large rotating machinery, such as electrical motors driving steel-rolling mills, particularly to protect such a motor from overspeed such as might be caused by loss of a shunt field. Because of the size of such motors, excess speed can be a serious hazard resulting in not only the potential loss or damage to machinery and equipment but also a serious loss in productive time on the rolling mill during the time required for repair and replacement. Most speed detectors I am aware of are mechanically operated and lack sensitivity and speed of operation.

In accordance with my invention a motor shaft synchronized device provides a pulse for each revolution of the motor shaft. The pulse also triggers a time-based pulse which is on a following predetermined time interval and if the next pulse occurs within the predetermined time interval, a speed controller and alarm indicates that the shaft speed is excessive, requiring corrective action.

It is therefore an object of my invention to provide apparatus for detecting a shaft speed beyond a predetermined limit.

Another object is to provide apparatus which automatically initiates corrective action when a shaft speed exceeds a certain limit.

A still further object is to provide apparatus that automatically indicates that a predetermined speed has been reached.

Still another object is to provide speed detection apparatus that is fast and sensitive.

Figure 1:
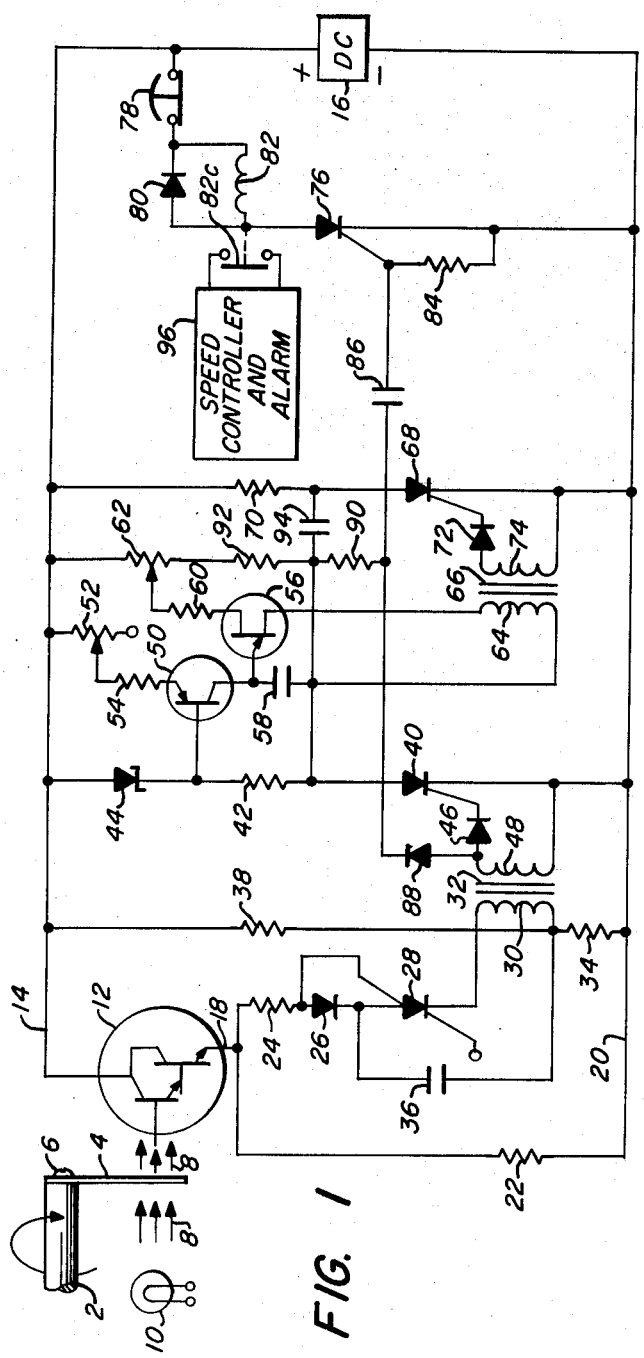
Figure 2:
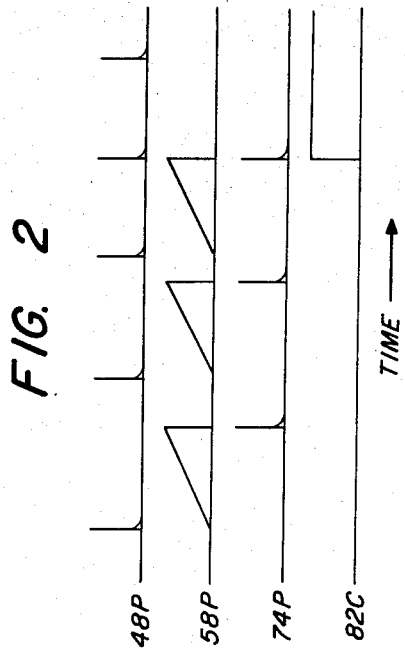

These and other objects will become more apparent after referring to the following specification and drawing in which:

FIG. 1 is a schematic drawing for the circuit of the preferred embodiment of my invention: and FIG. 2 is a timing diagram of the circuit shown in FIG. 1.

Referring now to Figure 1, reference numeral 2 refers to a rotating shaft, such as a mill motor shaft, rotating as shown by the arrow, for which it is desired to determine when the rotational speed exceeds a predetermined value. On the end of shaft 2 is a fixed and opaque strip 4 by means of a screw 6 so as shaft 2 rotates, strip 4 interrupts a light beam 8 from a light source 10 falling on a photosensitive device 12 here shown as a transistorized amplifier in a Darlington configuration. Strip 4 may also be connected to shaft 2 by means of belts or gears. Device 12 is connected to a positive bus 14 of a direct current source 16 and has an output connection 18 connected to a negative bus 20 of source 16 through a resistor 22.

Output connection 18 is also connected to negative bus 20 through a resistor 24, a diode 26, a silicon control switch 28, a primary winding 30 of a first pulse transformer 32 and a resistor 34. Switch 28 has an anode gate connected to the junction of resistor 24 and diode 26. A first capacitor 36 is connected to the junction of primary 30 and resistor 34 and an anode of switch 28. A resistor 38 is connected between bus 14 and the junction of primary winding 30 and resistor 34.

A first silicon control rectifier 40 has a cathode connected to negative bus 20; an anode connected to bus 14 through a resistor 42 and a zener diode 44; and a gate connected to bus 20 through a diode 46 and a secondary winding 48 of transformer 32.

A time-base circuit has a transistor 50 which has a base connected to the junction of diode 44 and resistor 42 and a collector connected to bus 14 through a variable resistor 52 and a resistor 54. A unijunction transistor 56 has an emitter connected to an emitter of transistor 48 and through a capacitor 58 to the junction of the anode of rectifier 40 and resistor 42. Transistor 56 has a first base connected to positive bus 14 through a resistor 60 and a center tap of a potentiometer 62 and a second base connected to the junction of the anode of rectifier 40 and resistor 42 through a primary winding 64 of a pulse transformer 66.

A second silicon control rectifier 68 has an anode connected to positive bus 14 through a resistor 70; a cathode connected to negative bus 20; and a gate connected to negative bus 20 through a diode 72 and a secondary winding 74 of pulse transformer 66.

A third silicon control rectifier 76 has an anode connected to positive bus 14 through a reset switch 78 and the parallel combination of a diode 80 and a relay coil 82; a cathode connected to negative bus 20; and a gate connected to negative bus 20 through a resistor 84 and to the junction of secondary winding 48 and diode 46 through a capacitor 86 and diode 88. The junction of capacitor 86 and diode 88 is connected to positive bus 14 through a resistor 90, a resistor 92 and potentiometer 62. A capacitor 94 is connected between the junction of the anode of rectifier 68 and resistor 70 and the junction of resistor 90 and 92 which is also connected to the junction of the anode of rectifier 40 and resistor 42. Relay coil 82 has normally open contacts 82C connected to a speed controller 96 which may also include an alarm.

In operation, the direct current power source 16 is turned on to activate the circuit. Variable resistor 52 is set to a value corresponding to the desired charging rate of capacitor 58 or as shown in FIG. 2 on line 58P, the slope of the voltage pulses. Potentiometer 62 is set to a value corresponding to the magnitude of the desired charge on capacitor 58 as shown in FIG. 2 on line 58P, by the magnitude of the voltage pulses at cutoff. Light from source 10 falls on device 12 and strip 4 interrupts the light beam 8 each time the strip passes between light source 10 and device 12. Any number of light-interrupting strips may be used but only one is shown. The junction of capacitor 86 and resistor 90 rises to a positive potential through potentiometer 62 and resistors 90 and 92.

When light falls on device 12, its internal impedance drops to a low value permitting capacitor 36 to charge through resistor 24 and diode 26. This makes the potential of connection 18 positive with respect to the potential of the junction of winding 30 and resistor 34. When strip 4 interrupts light beam 8, the impedance of light device 12 changes to a very high value and the potential of connection 18 goes negative with respect to the potential of the junction of winding 30 and resistor 34. The anode of silicon switch 28 is held positive by diode 26 and capacitor 36. The anode gate of switch 28 is thus negative with respect to its anode and switch 28 turns on discharging capacitor 36 through primary winding 30 of pulse transformer 32. This induces pulse 48P as shown in FIG. 2 in the secondary winding 48. Pulse 48P acts to trigger rectifier 40 on so that power is supplied to the time-base circuit. When rectifier 40 turns on, capacitor 94 begins charging through resistor 70.

When rectifier 40 turns on, a constant current source consisting of transistor 50, zener diode 44, and resistors 42, 52, and 54 begins charging capacitor 58 as shown by 58P in FIG. 2. When the voltage on capacitor 58 has reached the trigger voltage of unijunction transistor 56, the impedance between the unijunction emitter and the unijunction base connected to primary winding 64 changes from a very high value to a very low value. Capacitor 58 then discharges through primary winding 64 inducing a pulse 74P, as shown in FIG. 2, in secondary winding 74 of pulse transformer 66. Pulse 74P then turns on rectifier 68.

When rectifier 68 turns on, capacitor 94 discharges turning off rectifier 40. As soon as rectifier 40 is turned off, capacitor 94 begins charging, but in the opposite polarity from the previous charge, through resistors 62 and 92. When the next 48P pulse turns rectifier 40 on, capacitor 94 discharges to turn rectifier 68 off and then begins charging again. Rectifiers 40 and 68 thus act similar to a flip flop, each one when triggered on turns the other off.

The positive potential at the junction of capacitor 86 and resistor 90 is positive and greater than the pulse voltage 48P so diode 88 blocks the pulse 48P from affecting the gate of rectifier 76. However, if shaft 2 is rotating fast enough to provide a pulse 48P before rectifier 68 turns on to turn rectifier 40 off, the potential at the junction of capacitor 86 and resistor 90 is no longer positive and a pulse 48P will now trigger rectifier 76 on. This energizes relay coil 82 and closes relay contacts 82C to activate the speed controller and alarm 96, such as a circuit breaker, warning light, warning horn or other device. Reset switch 78 is opened to reset the circuit when desired and diode 80 provides a way for coil 82 to discharge its residual energy when reset switch is opened.

This overspeed detector is simple to operate, simple to adjust and is fast acting, very sensitive and inexpensive.

I claim:

1. Apparatus for detecting overspeed of a rotating shaft comprising a source of light; a photosensitive cell arranged to receive light from said source; a light interrupter strip mounted on said shaft and adapted to interrupt the passage of light from said source to said cell for a predetermined period of angular movement of said shaft; a source of direct current; a first capacitor; a first circuit means connected to said cell, said direct current source and said capacitor whereby when light from said source is received by said cell said first capacitor charges and when light is not received by said cell said first capacitor discharges thereby providing a first pulse; a first silicon controlled rectifier having a cathode connected to said source of direct current and a gate connected to said first circuit means; a second capacitor; a constant current source connected to said second capacitor, said source of direct current and the anode of said first silicon controlled rectifier; second circuit means connected to said first silicon controlled rectifier, said second capacitor and said direct current source and responsive to the occurrence of each of said first pulses for charging said second capacitor at a predetermined rate to a predetermined magnitude and for discharging said second capacitor when the charge on said second capacitor reaches said predetermined magnitude thereby providing a second pulse; a second silicon controlled rectifier having a cathode and an anode connected to said source of direct current and a gate connected to said second circuit means whereby said second silicon controlled rectifier is turned on when said second capacitor discharges; a third capacitor connected between the anode of said first silicon controlled rectifier and the anode of said second silicon controlled rectifier whereby when one of said silicon controlled rectifiers is turned on, the other is turned off; an indicator; and means connected to said first circuit means, said second circuit means and said indicator and responsive to the occurrence of one of said first pulses occurring while one of said second pulses is rising to said predetermined magnitude for activating said indicator.

2. Apparatus according to claim 1 in which said means for activating said indicator includes a third silicon controlled rectifier having a cathode connected to said source of direct current, a relay having a coil connected between an anode of said third silicon controlled rectifier and said source of direct current, said relay having normally open contacts connected to activate said indicator, and a gating circuit connected to the gate of said first silicon controlled rectifier and the gate of said third silicon controlled rectifier whereby when said first silicon controlled rectifier is on, one of said first pulses will turn said third silicon controlled rectifier on.

3. Apparatus according to claim 2 in which said indicator includes a shaft speed controller and an alarm and which includes a reset switch connected between said relay coil and said source of direct current.

4. Apparatus according to claim 1 in which said constant current source includes means to adjust the magnitude of said constant current and in which said second circuit means includes means for adjusting said predetermined magnitude.

* * * * *